United States Patent Office 3,468,236
Patented Sept. 23, 1969

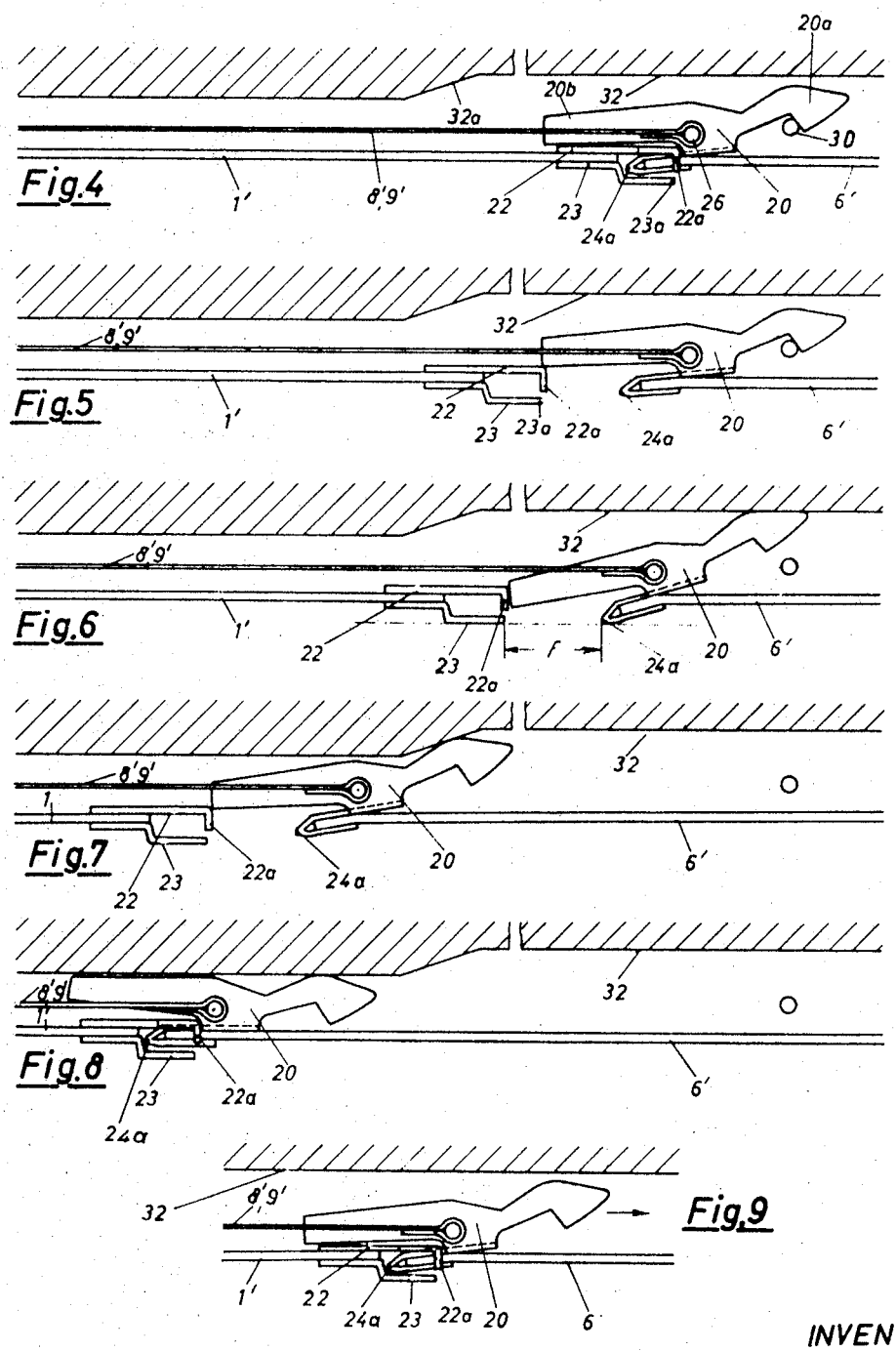

3,468,236
PHOTOGRAPHIC SLIT-TYPE SHUTTER
Waldemar T. Rentschler and Franz W. R. Starp, Calmbach, Black Forest, Germany, assignors to Prontor-Werk Alfred Gauthier, G.m.b.H., Calmbach, Black Forest, Germany, a corporation of Germany
Filed May 26, 1966, Ser. No. 553,119
Claims priority, application Germany, May 26, 1965, P 36,891
Int. Cl. G03b 9/28
U.S. Cl. 95—57　　　　　　　　　　　　　　　　11 Claims

ABSTRACT OF THE DISCLOSURE

A photographic slit-type shutter that provides a leading curtain and a lagging curtain following the leading curtain with the same speed after a specific slit width corresponding to the preset exposure time has been reached. The shutter provides for reliably maintaining during the entire exposure process the minimum slit width required for obtaining an extremely short exposure time. A locking device is provided which becomes automatically operative after the minimum slit width required for the shortest exposure time has been formed.

---

The present invention relates to a photographic slit-type shutter having a leading curtain and a curtain lagging the leading curtain with the same executing speed after a specific slit width corresponding to the preset exposure time has been attained.

Slit-type shutters of this species have, in the past, been unable to provide short exposure times of the order of $\frac{1}{1000}$ to $\frac{1}{2000}$ sec., through narrowing of the slit width. This condition was mainly due to the fact that it was not possible to reliably prevent the exposure slit from closing completely due to the relative displacement of the two curtains during the exposure process.

In another shutter arrangement differing from the preceding species, it has been proposed to preform the slit width when the shutter system is in cocked position, and to have the curtains always act jointly from this end position. The slit width corresponding to an extremely short exposure time was to be maintained by firmly locking together the two ratchet wheels coupled to the two curtains in the relative position corresponding to minimum slit width. Aside from the fact that the use of a locking or clamping device for this purpose is limited exclusively to those shutters in which the exposure slit is already preformed in the starting or cocked position (prior to the actual release of the shutter system), the clamping device is undesirable when constructed substantially of a lever-type trip cam and a plurality of stop pins. This is because the individual structural members give rise to problems in manufacture from the viewpoint of machining accuracy, as well as in assembly. Another disadvantage of this arrangement is that the cooperating structural members are subjected to continuous wear during the clamping or locking process. Accordingly, the capabilities of the clamping device are limited, and when the latter comprises a lever-type trip cam for the purpose of clamping the two ratchet wheels operating at high speeds, the solution of the problem is not satisfactory. This is especially so because of the possibility that the lever-type trip cam may be forced out of the clamping position during the rotary motion of the ratchets, due to the centrifugal force arising from such motion.

Accordingly, it is an object of the present invention to improve slit-type shutters as set forth to the extent that, by using comparatively structural means, the minimum slit width required for obtaining an extremely short exposure time is reliably maintained during the entire exposure process.

To achieve this object, the invention provides for a locking device which becomes automatically operative after the minimum slit width required for the shortest exposure time, has been formed. The locking device also prevents a relative motion of the two curtains in the sense of diminishing the minimum slit width for the duration of the exposure process. The invention, moreover, provides for a control device which renders the locking device automatically inoperative at the conclusion of the executing motion. This arrangement has made it possible to create a locking device which avoids the disadvantages of the preceding known device for securing the minimum slit width. The newly created device can also be used in those slit-type shutters wherein one curtain leads for the purpose of forming the slit after release of the shutter system, and wherein another curtain lags behind the leading one with synchronous executing speed after a specific slit width has been generated.

According to another embodiment of the invention, a particularly reliable and structurally robust arrangement can be obtained when each of the spools acquiring, during the exposure process, the leading curtain as well as the straps of the lagging curtain, is non-rotatably connected to a pinion. Each of the pinions meshes, in turn, with a coaxially positioned gear. The gear operatively connected to the spool of the lagging curtain carries an elastically yielding pawl, while a recess adapted to engage this pawl is provided on the other gear. The recess is arranged with respect to the pawl so that the latter drops automatically into the recess, as soon as the gear operating with the leading curtain has rotated, with respect to the other gear, to the extent that the minimum slit width corresponding to the shortest exposure time has been reached.

In order to obtain an extremely simple locking device which will not interfere with the generating of longer exposure times, the invention further provides that the pawl be formed of a leaf spring having, at its movable end, a locking edge counteracting the relative motion of the two gears. The movable end of the leaf spring is also provided with an inclined ride-up edge permitting relative rotation of the two gears in the sense of widening the slit beyond the minimum slit width.

According to another embodiment of the invention, the pawl is associated with a control device which moves the pawl and blocks the gear connected to the lagging curtain, in the starting or cocked position of the shutter system. The control device automatically releases this gear again when the gear of the leading curtain has reached the lead corresponding to the minimum slit width. The control device, moreover, guides the pawl out of the locking position assuring minimum slit width in the final phase of the executing or functional motion of the two curtains.

In order to obtain a control device which fully meets the requirements for structural simplicity and operating reliability, the invention further provides that the control device be formed of a fixed curved member adapted to the circumference of the two gears. The curved member is provided, at both ends, with inclined ascending edges as well as with a locking notch located between these edges. A radially extending arm provided on the pawl, cooperates with the curved member.

According to another embodiment of the invention, particular advantages from the operational viewpoint as well as structural simplicity are realizable when the locking device is formed of two pawls secured bilaterally in the region of the slit edge of one of the curtains. The pawls are held and guided so that, after formatiton of the minimum slit width, they automatically enter the slit in a locking manner, and automatically leave the slit after the exposure process is completed. This arrangement is especially simple from the structural viewpoint, and permits the elimination of the additional gears which are coupled to the curtains and cooperate with the pawl.

A particular reliable arrangement can be obtained when the pawls are fixed to the lagging curtain and are slidingly guided by means of pins or pivots. In the starting or cocked position of the shutter system, the pawls are held at one end, by a fixed pin, and, at the other end, they are supported by the edge of the leading curtain which faces them. The arrangement is such that when the minimum slit width is reached by the leading curtain, the pawls slide off the edge of the curtain and, while being simultaneously unhooked from the fixed pin, are automatically located in front of the preceding edge in a locking manner. They are caused to automatically leave this locking position by a control device in the final phase of the executing motion.

In order to obtain, in addition, a parallax compensation by means of the above arrangement, the invention provides that the pins or pivots designed to guide the lagging curtain are arranged with respect to the edge of the latter, so that when the pawls drop into the slit, the edge enters the plane of motion of the edge of the leading curtain. This produces the effect wherein the opposite edges of the curtains forming the slit move past the image plane with equal separation. In order to assure proper operation of the locking device, the invention further provides that a guide edge adapted to the executing motion of the curtains, be associated with at least one of the two pawls. The guide edge guides the two pawls out of the locking position, in the final phase of the executing motion, by means of a ride-up ramp provided on the guide edge.

Other advantages and features of the present invention appear in the following specification which describes two embodiments in conjunction with the accompanying drawing in which:

FIGURES 4–9 are top views of the locking device illustrated in FIGURE 3, showing different phases of motion during the exposure period of the shutter, with the straps of the leading curtain omitted for the sake of clarity; the various figures show the following particular details:

FIGURE 4 shows the arrangement in starting or cocked position;

FIGURE 5 shows the arrangement after the release, with the minimum slit width almost reached by the leading curtain;

FIGURE 6 shows the locking device in its operative position after the minimum slit width has been reached, and during the executing motion of the two curtains over the gate;

FIGURE 7 shows when the locking device begins to become unlocked in the final phase of the executing motion;

FIGURE 8 shows the arrangement at the end of the executing motion;

FIGURE 9 shows the arrangement while the two curtains are returned to the starting or cocked position.

Figures 1, 2:
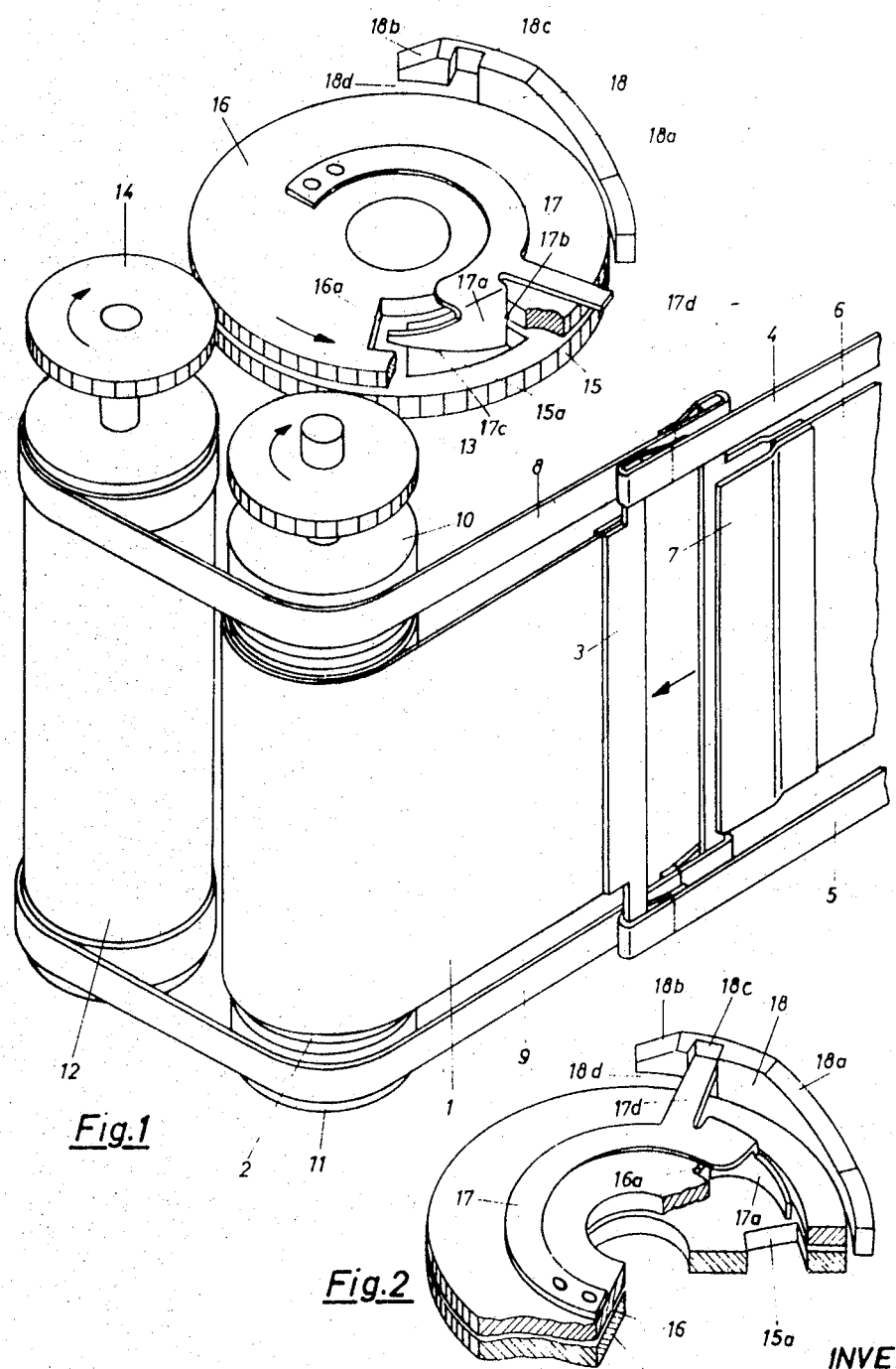
FIGURE 1 is a fragmentary isometric view, and shows portions of a slit-type shutter, including the spool for the curtain and straps engaged in winding up during the exposure process, together with the locking device for limiting the minimum slit width of the shutter.
FIGURE 2 is a partial view showing the locking device in the starting or cocked position of the shutter.

Referring to the embodiment of FIGURE 1, the leading curtain is designated by 1. During the exposure process, the shutter system operates in the direction indicated by the arrow, and the curtain 1 is wound on a spool 2 which is driven, in the commonly-known manner, by a driving spring located inside the spool. At its edge designed to form the slit, the curtain 1 is bordered by a metal frame 3 gripped by straps 4 and 5 which operate from spools not shown in the drawing. The lagging curtain 6 is also derived from a spool (not shown in the drawing) during the exposure process. At its edge travelling past the gate, the curtain 6 has a metal mounting 7 shaped to form a slot for the metal frame 3. The mounting 7 serves, at the same time, for suspending the straps 8 and 9. These straps are guided over loosely positioned guide rollers 10 and 11, and are wound, during the exposure process, about the roller 12 driven by means of an internal spring in a manner similar to that described in relation to spool 2.

The pinions 13 and 14 are fixed to the winding spools 2 and 12. The two pinions are identical, and mesh with gears 15 and 16 respectively. The two coaxially positioned gears 15 and 16 are also identical, and their gear ratio with respect to the pinions 13 and 14 is such that they execute less than a full revolution during the executing motion of the curtains 1 and 6.

The pawl 17, in form of a leaf spring, is fixed at one end and situated on the gear 16 which is drivingly connected to the winding spool 12 of the lagging curtain 6. While the two gears 15 and 16 are provided with openings 15a and 16a, the drivable end of the pawl 17 has an arresting lug 17a bent along the direction of the gears. The lug 17a has an arresting edge 17b extending perpendicular to the plane of motion. In addition, the lug includes the inclined ascending edge 17c to allow relative rotation of the two gears 15 and 16 in the sense of widening the exposure slit formed by the curtains 1 and 6. The arresting lug 17a of the pawl 17 passes through the opening 16a of gear 16, and is thus able to act on gear 15.

When the curtains 1 and 6 are closed, i.e., in their two end positions or during the cocking process, the arresting lug 17a rests on the upper face of the gear 15, as shown in FIGURE 2. At the start of the executing motion of gear 15 coupled to the leading curtain 1, the opening 15a approaches the arresting lug 17a, so that the latter finally slides off the surface of the gear 15 and drops into the opening 15a. The gear 16 does not yet participate in this first phase of motion because of the slit formation. As a result, the two gears 15 and 16 are no longer able to execute relative motions which would bring about a reduction of the minimum slit width obtained from the engagement of the pawl 17. The situation differs with regard to the inclined edge 17c which permits widening of the slot, formed by the two curtains 1 and 6, beyond the minimum width by further relative rotation of the two gears 15 and 16.

In order to prevent the gear coupled to the lagging curtain 6 from moving at the start of the release motion of the shutter, and in order that pawl 17, assuring minimum slit width, is made inoperative again after the exposure process, a control device 18 is provided. The latter may be formed of a fixed curved member adapted to the circumference of the two gears 15 and 16. This curved member 18 is provided with ascendingly inclined edges 18a and 18b, as well as a locking notch 18c located between these edges. The locking notch extends transversely to the edges 18a and 18b, and to the direction of motion of the gears 15 and 16. The notch 18c receives the radial arm 17d situated on the pawl 17 when the curtains are in the starting or cocked position.

In the operating direction, the locking notch 18c includes an outlet 18d which allows the radial arm 17d to leave the locking position illustrated in FIGURE 2. This occurs when the opening 15a has arrived within the range of the pre-stressed pawl 17, after a certain lead of the gear 15 corresponding to the minimum slit width. In this manner the pawl 17, while engaging the opening 15a, is able to move downward and to participate, subsequently, with gear 16 in the motion of gear 15. The ascendingly inclined edge 18a becomes operative in the final phase of motion of the two gears 15 and 16 which always operate synchronously after the slit has been formed. The control edge 18a serves the purpose of lifting the pawl 17 out of the locking position with the aid of the radial arm 17d situated on the pawl. In this manner, the gear 16 coupled to the lagging curtain 6 is able to rotate, at the end of the executing motion, with respect to the gear 15 until the final closing of the curtains 1 and 6.

If the two curtains 1 and 6 are subsequently moved in the opposite direction to that indicated by the arrow in FIGURE 1, so that they may be jointly returned to the starting or cocked position by means of the device not shown in the drawing, the two gears 15 and 16 execute a synchronous clockwise rotation. Shortly before the two curtains 1 and 6 have reached their starting or cocked position, the radially extending arm 17d rides up the inclined edge 18b, and finally drops into the locking notch 18c at the end of the cocking motion. As already indicated, and as apparent from FIGURE 2, the dropping motion of the arm 17d is terminated prematurely because the tip of the arresting lug 17a formed by edges 17b and 17c, impinges upon the top face of the gear 15. Only when there is a relative movement of the two gears 15 and 16 at the starting motion of the shutter system for the purpose of forming the exposure slit, does the arresting lug 17a arrive again within the region of the opening 15a.

The gears 15 and 16 may also cooperate, in connection with the arresting device, with those spools on which the curtain 6 and the straps 4 and 5 are wound during the cocking process. These gears may even be made a component of the cocking mechanism. If the spools are, moreover, coaxially situated, and of a size so that they execute less than complete revolution during the cocking and exposure process, the gears 15 and 16 may be located directly on the spools.

Figure 3:
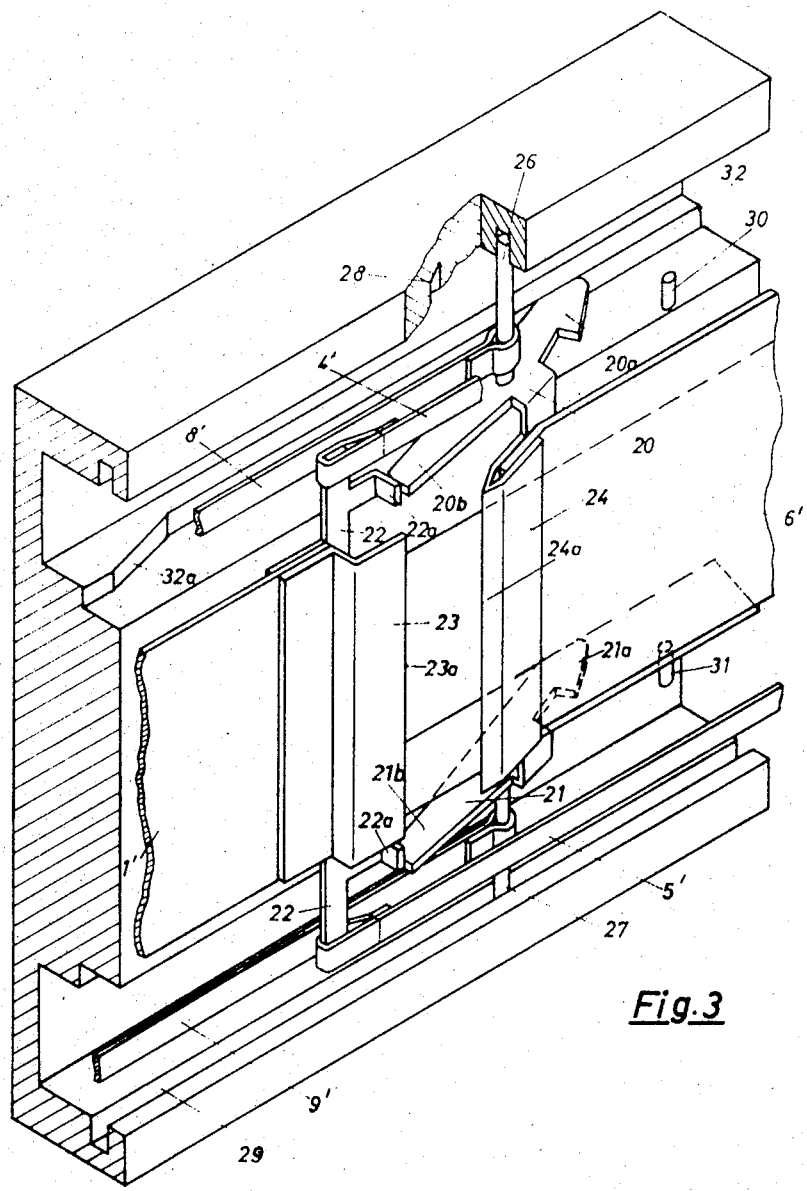
FIGURE 3 is a partial isometric view of another embodiment for limiting the minimum slit width, with the locking means arranged directly within the range of the curtain edges forming the exposure slit.

In the embodiment of FIGURES 3 to 9, the members which are identical to those of the arrangement of FIGURES 1 and 2, are provided with the same reference numerals but with a prime. In this embodiment of FIGURES 3 to 9, two-armed pawls 20 and 21 may be situated on both sides of the lagging curtain 6' within the range of the slit edge, for the purpose of preventing relative motion of the two curtains 1' and 6' towards reducing the minimum slit width. FIGURE 3 is an isometric view of the device, and shows the leading curtain 1' bordered at its slit edge with a metal frame consisting of the members 22 and 23 to form a retaining means. The lagging curtain 6' has at its slit edge a metal frame 24 capable of extending into the metal frame 22–23 at both of the two end positions and during the cocking process. The two afore-mentioned pawls 20 and 21 may be fixed to the metal frame 24.

The two straps 4' and 5' which during the cocking process, are wound on spools (not shown in the drawing) located to the right in FIGS. 3–9, are suspended from the metal frame 22–23 of the leading curtain 1'. The pins or pivots 26 and 27 are secured to the bent-up ends of the metal frame 24, which form the pawls 20 and 21. The pins or pivots serve, on the one hand, for suspending the straps 8' and 9' of the lagging curtain 6' and, on the other hand, for guiding the pawls 20 and 21 as well as the slit edge of the lagging curtain 6'. In this connection, the ends of the pivots 26 and 27 are located within rectilinear slideways 28 and 29 respectively. These slideways are adapted to the executing motion of the curtain 6', and may be situated on the camera housing (not shown in the drawing).

With regard to the design of the two-armed pawls 20 and 21, the invention provides that the arm 20a or 21a facing the lagging curtain be hook-shaped. In this manner, the curtain 6' may be arrested in the starting or cocked position by means of a fixed pin 30 or 31.

When the preceding shutter system is released, the leading curtain 1' begins to move while the lagging curtain 6' remains, as yet, in the starting position. The arm 20b or 21b of the pawls, which faces the leading curtain 1', rests on the metal frame 22–23. However, when the leading curtain 1' has moved to the extent that the arms 20b and 21b lose their support on the metal frame 22–23 (when the minimum slit width is reached), the pawls 20 and 21 as well as the frame 24 of the lagging curtain 6' execute a counterclockwise motion about the pivots 26 and 27. The pawls 20 and 21 are caused to perform a tilting motion as a result of the tension of straps 8' and 9' which exert a continuous turning moment upon the pawls.

The hook-shaped arms 20a and 21a are disengaged from the pins 30 and 31 in a positive manner, as shown in FIGURE 6, by the tilting motion of the pawls 20 and 21. This tilting motion is limited as a result of the arm 20a abutting against a guide edge 32 situated within the range of the motion. The guide edge 32 is provided, at one end, with an ascendingly inclined ramp 32a.

In addition to bringing about the unlocking action, the tilting motion of the pawls 20 and 21 causes the arms 20b and 21b to be placed in front of the metal frame 22–23 which may be provided on each side with an arresting clip 22a. This arrangement assures a minimum slit width, i.e., the minimum distance between the leading and lagging curtain 1' and 6' respectively, during the exposure period.

Another result of the tilting motion is that the limiting edge 24a of the metal frame 24 swings into the same plane of motion as the limiting edge 23a of the metal frame 22–23. This plane is indicated by the dash-dot lines in FIGURE 6. This tilting motion of the limiting edge 24a, which serves to secure the minimum slit width, also prevents exposure differences at the right and left edge of the picture. These undesirable exposure differences are caused by parallaxes in the conventional slit-type shutters.

The arresting of the lagging curtain 6' until the minimum slit width is reached, as described above, also makes it possible to release simultaneously upon setting the shortest exposure time. This is accomplished by influencing appropriately the holding members which usually become operative in the starting or cocked position. However, the lagging curtain 6' may also be released at another moment during the period within the slit width 0 and the minimum slit width f to be realized (see FIGURE 6).

If a greater slit width (not shown) is set for the purpose of obtaining an exposure time which is longer than the shortest exposure time, the functions described above and illustrated in FIGURES 3–7, occur in the same manner. However, the unlocking of the lagging curtain 6' at the pins 30 and 31, does not, as yet, occur for follow-up purposes when the minimum slit width has been reached. The follow-up of the curtain 6' can start only when the latter has been released by the commonly-known means for the formation of the slit as, for example, escapement mechanism or the like which operate in conjunction with the curtain. The swinging of the limiting edge 24a into the plane of motion of the limiting edge 23a has a similar positive effect, i.e., it is an equally important factor for the quality of the photograph picture, as for photographs with the shortest exposure time.

When the two curtains 1' and 6' have passed the full width of the gate (not shown in the drawing), the complete closing of the exposure slit must be brought about automatically. In order to obtain this result, the guide edge 32 is provided with a ride-up ramp 32a as already described. This ride-up ramp 32a causes, in turn, the pawl 20 abutting against the edge during the exposure process, to execute a clockwise rotation about the pivots 26 and 27 in the final phase of the executing motion of the curtains 1' and 6'. The arms 20b and 21b of the pawl, which face the leading curtain 1', are moved, in a positive manner, out of the arresting position that they previously occupied. As a result, the lagging curtain 6' moves with respect to the leading curtain 1' in the direction of closing the exposure slit. This occurs as soon as the leading curtain 1' has reached its end position, and is due to the tensile force acting on the curtain 6'. At the end of this relative motion, the metal frame 24 slips into the mating metal frame 22–23 of the leading curtain 1', and thereby brings about the complete closing of the curtain system. During the subsequent cocking process shown in FIGURE 9, the two curtains 1' and 6' are synchronously returned by means of a device not shown in the drawing, and the formation of the slit is thereby avoided in the commonly-known manner.

What is claimed is:

1. In a photographic slit-type shutter having a leading curtain and a lagging curtain following said leading curtain with the same executing speed of motion after a specific slit width corresponding to the preset exposure time has been reached, means associated with said two curtains for forming said slit width, means for jointly returning said curtains to the cocked position, a locking device becoming automatically operative after the minimum slit width required for obtaining the shortest exposure time has been formed and preventing relative motion between said two curtains in the direction of reducing the minimum slit width for the duration of the exposure process, and a control means rendering said locking device automatically inoperative at the end of the executing motion, a curtain spool for receiving the leading curtain, a strap spool for receiving straps associated with the lagging curtain, a first pinion means fixed to said curtain spool, a second pinion means fixed to said strap spool, a first gear means meshing with said first pinion means and a second gear means meshing with said second pinion means, said first and second gear means being coaxially positioned, and a pawl means carried by said second gear means, said first gear means having a recess automatically engaged by said pawl when said first gear means has rotated with respect to said second gear means so that minimum slit width corresponding to the shortest exposure time has been reached.

2. A photographic slit-type shutter according to claim 1, wherein said pawl means comprises a leaf spring having an arresting edge counteracting the relative motion of said first and second gear means, and an ascendingly inclined edge allowing relative rotation of said first and second gear means for widening the slit beyond the minimum slit width.

3. A photographic slit-type shutter according to claim 2, further including a control means associated with said pawl means for blocking said second gear in the starting position of said shutter and automatically releasing said second gear when said first gear has reached the lead corresponding to the minimum slit width, said control means guiding said pawl means in the final phase of the executing motion of said curtains so that minimum slit width is assured.

4. A photographic slit-type shutter according to claim 3, wherein said control means comprises a curved member adapted to the circumference of said first and second gears, said control device having two ends and an inclined ascending edge associated with each end and having a locking notch located between said ends for cooperating with a radially extending arm associated with said pawl means.

5. A photographic slit-type shutter according to claim 1, wherein said locking device comprises two locking pawl means entering automatically and lockingly the slit after latter's minimum width formation has been released by said curtains, and leaving said slit after the exposure process is terminated.

6. A photographic slit-type shutter of claim 5 wherein said two locking pawl means are situated on opposite sides of said slit and within the region of the slit edge of one of said curtains.

7. A photographic slit-type shutter according to claim 6, including pivot means for guiding said pawl means in accordance with a slideway associated with said pivots.

8. A photographic slit-type shutter according to claim 7, further including at least one fixed pin situated in the path of said locking pawls and hooking into said locking pawls at one end in the starting position of said shutter, said pawls being supported at the other end by the edge of the leading curtain facing them and operating so that they slide off said leading curtain edge and are unhooked from said fixed pin when the minimum slit width is reached by the leading curtain.

9. The photographic slit-type shutter of claim 8 including a control device acting upon said locking pawls so that after latter are automatically placed in front of the edges of said slit in a locking position when the minimum slit width has been reached by the leading curtain, said locking pawls are automatically removed from said locking position in the final phase of the executing motion.

10. A photographic slit-type shutter of claim 9, wherein said pivot means for guiding said locking pawls are situated with respect to said locking pawls and the edge of the lagging curtain so that latter enters the plane of motion of the edge of the leading curtain when said locking pawls engage said slit.

11. A photographic slit-type shutter of claim 9, including a guide means adapted to operate in conjunction with the executing motion of the curtains, said guide means having a ramp and being associated with at least one of said locking pawls to guide said locking position in the final phase of the executing motion.

References Cited

UNITED STATES PATENTS 2,218,248   10/1940   Mihalyi _____ 95—57

JOHN M. HORAN, Primary Examiner